United States Patent Office 2,937,102
Patented May 17, 1960

2,937,102
ZIRCONIA STABILIZATION CONTROL

Harold C. Wagner, Cleveland Heights, Ohio, assignor to Zirconium Corporation of America, Solon, Ohio, a corporation of Ohio No Drawing. Application March 18, 1957
Serial No. 646,561

3 Claims. (Cl. 106—57)

This invention relates to a stabilized zirconia which is highly resistant to thermal shock and to a method of closely controlling the degree of stabilization of zirconia to obtain a product which is highly resistant to thermal shock.

An object of the present invention is to provide a method of de-stabilizing zirconia to obtain high heat shock resistance by chemically combining with a starting zirconia which has more than 96 percent thereof in the stabilized cubic form, sufficient of an acid refractory to leave in the finished zirconia between 70 percent and 96 percent in the stabilized cubic form, 80 to 92 percent in the stabilized cubic form being the preferred range, especially where heat shock resistance is required.

It is common knowledge that relatively pure monoclinic zirconia has a relatively low coefficient of expansion, and usually a material with a low coefficient of expansion withstands thermal shock much better than a substance having a higher coefficient of expansion. However, monoclinic zirconia is practically useless in the form of a refractory shape when it is subjected to temperatures in excess of about 1000 degrees centigrade since a reversible crystal inversion and volume contraction and expansion takes place which disrupts the zirconia body. Completely stabilized zirconia in the cubic form has too high a coefficient of expansion to be highly resistant to thermal shock. There is an optimum composition between the 100 percent stabilized or cubic form and the 100 percent monoclinic form in which the coefficient of expansion is somewhat lower than that of the 100 percent cubic form but yet retains sufficient stability to prevent destructive disruption of the zirconia body when subjected to large thermal gradients. This condition exists between about 70 percent and 96 percent of stabilized or cubic form zirconia, with by far the best results being obtained at between 80 and 92 percent of stabilization in the finished product.

The stabilizing agents usually present in zirconia are CaO and/or MgO. If we were to form a shape from stabilized zirconia containing approximately 12.0 mole percent of these stabilizing agents in solid solution with the zirconia, we would have a 100 percent stabilized cubic form zirconia which has a high coefficient of expansion and consequently is not the most desirable product with respect to heat shock resistance. The present invention reduces the percentage of cubic form or stabilized zirconia by adding to the starting zirconia, as a de-stabilizing agent, a predetermined amount of an acid refractory, preferably chosen from the group silica and alumina. This acid refractory, at high temperature in an oxidizing atmosphere, will react chemically with a predetermined amount of the stabilizing agents, such as the CaO and MgO mentioned above, to form a new chemical combination with the silica as a separate and discrete phase in the finished zirconia.

My invention will be best understood from a specific example of the application of my method. Assume that we start with 100 pounds of a zirconia product analyzing 4.62 percent (by weight) CaO, 1.10 percent MgO, and .30 percent $SiO_2$, the remainder being substantially $ZrO_2$. In this case, the $SiO_2$ represents an acid refractory present as an impurity in the starting zirconia and which will normally react with the CaO and MgO at high temperature to take some of the CaO and MgO out of solid solution in the zirconia so as to remove certain amounts of these stabilizing agents and thus produce a de-stabilizing action of its own. I, therefore, allow for such acid refractories present as impurities in the starting zirconia to determine the net moles of stabilizing agent which equals the moles of CaO plus the moles of MgO minus the moles of acid refractory present such as the $SiO_2$ in this example. Calculations would then give 4.62 divided by 56 equals 0.0825 mole of CaO; 1.10 divided by 40 equals 0.0275 mole of MgO; and .30 divided by 60 equals 0.005 mole of $SiO_2$. The net moles of stabilizing agent present in the starting zirconia would then equal .0825 plus .0275 minus .005 which equals .105.

The number of moles "X" of de-stabilizing acid refractory (in this case assumed to be silica) to be added to the starting zirconia is calculated according to the formula: X=(net moles of stabilizing agent present in starting zirconia) minus Y, where Y represents the moles of stabilizing agents desired to be present in the finished zirconia in solid solution with $ZrO_2$. As mentioned above, the preferred range is 80 percent stabilized cubic form zirconia (20 percent monoclinic form) to 92 percent stabilized cubic form zirconia (8 percent monoclinic form), which corresponds respectively to 0.070 mole to 0.080 mole of such stabilizing agents in solid solution. Definite improvements are however noted in the range of 70 percent stabilized cubic form zirconia (30 percent monoclinic form) to 96 percent stabilized cubic form zirconia (4 percent monoclinic form), which corresponds respectively to .065 mole to .0884 mole of such stabilizing agents in solid solution. For this example, let us choose Y as .070. Then X equals .105 minus .070 which equals .035 mole of $SiO_2$ to be added for every 100 pounds of starting zirconia. Then .035 times 60 equals 2.1 pounds of silica to be added to the starting zirconia. Therefore, the starting batch would be 100 pounds of stabilized zirconia (analyzing 4.62 percent CaO, 1.10 percent MgO and .30 percent $SiO_2$) plus 2.1 pounds of silica.

The ".070 mole to .080 mole" referred to above may be calculated in "mole percent" in the following manner. The ".070 mole" refers to .070 mole of stabilizing agent per 100 lbs. of stabilized zirconia, i.e., $ZrO_2$ plus CaO. For example, .070 mole of CaO (stabilizing agent) is equivalent to .070×56 (molecular wt. of CaO) equals 3.29 lbs. of CaO. Then since 100# of $ZrO_2$ plus CaO is the basis for calculation, we would have 100# minus 3.92#=96.08 lbs. of $ZrO_2$.

96.08 lbs. $ZrO_2$ is equivalent to .781 mole of $ZrO_2$
3.92 lbs. CaO is equivalent to .070 mole of CaO 100.00      .851 or on a percentage basis this would be $$\frac{.070}{.851} = 8.23 \text{ mole percent}$$

Thus, .070 mole of stabilizing agent (CaO) per 100 lbs. of stabilizing compound ($ZrO_2$ plus CaO) is equivalent to 8.23 mole percent of stabilizing agent. The same calculation changes ".080 mole" to "9.35 mole percent."

The above starting zirconia and the silica to be added thereto are finely ground separately preferably to pass through a 325 mesh sieve, and then thoroughly mixed together with a temporary binder which will later volatilize such as 1 pound of polyvinyl alcohol. Additional small amounts of water may be added as necessary for molding, in one case this equals about 4 pounds of water. The entire mixture is then stirred until evenly mixed and then pressed into the desired shape on a hydraulic press or the like. The molded form is then fired to a temperature above about 2400 degrees Fahrenheit in an oxidizing atmosphere. The reaction is more complete with higher temperatures and/or longer firing times. One satisfactory method is to hold the product at 2550 degrees Fahrenheit for one hour. Preferably, the heating rate is of the order of 500 degrees Fahrenheit per hour, and the cooling rate afterwards at about the same gradient. This procedure was followed to determine the most desirable product, leading to the setting up of desirable mole ratios of stabilized zirconia in the final product as mentioned above. The products which did not show cracks after the above procedure, were determined as desirable.

After firing the above example batch, to the point where a complete reaction took place between the added silica and the stabilizing agents originally present in the starting zirconia, the final product shows a composition containing .070 mole of stabilizing agents (CaO and MgO) in solid solution with the zirconia and .035 mole of those stabilizing agents tied up with the added silica as a separate and discrete phase. The final product would now show monoclinic zirconia to be present in the range of 20 percent and stabilized zirconia in the range of 80 percent.

The usual amounts of de-stabilizing agent necessary to add to the starting zirconia are very small varying usually from about 0.3 percent to 5.0 percent $SiO_2$, or from about 1.5 percent to 10 percent (by weight) of aluminum oxide. Thus, by small variations in the amount of de-stabilizing agent added to the starting zirconia, I am able to effect large variations in the degree of stabilization of the final product. Also, when I know the analysis of the starting zirconia, I can calculate the desired degree of stabilization wanted in the final product, and add the exact amount of de-stabilizing agent to produce the final result.

When using alumina ($Al_2O_3$) as a de-stabilizing agent, in place of the silica mentioned in the preceding illustration, I have found that for a starting zirconia containing 4.6 percent CaO and 1.1 percent MgO (as in the preceding example), the heat shock resistance is greatly improved by adding from 2.8 to 6.8 percent $Al_2O_3$, the preferred range being from 4.2 to 5.9 percent $Al_2O_3$. The formula for the calculation in this case would be:

$$X = \frac{5}{3}\left(\frac{A}{56} + \frac{B}{40} - \frac{C}{60}\right) - Y$$

where Y is between approximately 0.065 and 0.0884, the preferred range being approximately 0.070 and 0.080. In the above equation A is the percent CaO, B is the percent MgO, and C the percent $SiO_2$ in the starting zirconia. X is the moles of finely divided $Al_2O_3$ to be added to the starting zirconia according to the above formula.

I am assuming from my experiments that the CaO of the starting zirconia combines with the $Al_2O_3$, added for de-stabilizing, in the proportions of 3 molecules of CaO to 5 molecules of $Al_2O_3$. I draw this assumption from a study of the phase diagram data, and the assumption is substantiated in an indirect manner from the results I have obtained experimentally. I have found that almost three times as much $Al_2O_3$ must be added to a given starting zirconia to get the equivalent heat shock resistance in the final product, as when $SiO_2$ is used as in the first described calculation.

Assume that we start with 100 pounds of a zirconia product analyzing 4.62 percent (by weight) CaO, 1.10 percent MgO, and .30 percent $SiO_2$. Utilizing the same calculations as in the example where silica was used for de-stabilizing, we calculate the net moles of stabilizing agent present in the starting zirconia as equal to .0825 plus .0275 minus .005 which equals .105.

According to the last mentioned formula now, and choosing Y as .070 mole, then X equals 5/3 (.105 minus .070). X then is calculated to equal .0583 mole. Then .0583 times 102 equals 5.9 pounds of alumina to be added to the starting zirconia. Therefore, the starting batch would be 100 pounds of stabilized zirconia (analyzing 4.62 percent CaO, 1.10 percent MgO and .30 percent $SiO_2$) plus 5.9 pounds of alumina.

The above starting zirconia and the alumina to be added thereto are finely ground separately, preferably to pass through a 325 mesh sieve, preferably then thoroughly mixed together with a temporary binder which will later volatilize, such as one pound of polyvinyl alcohol, additional water if necessary for molding, generally only a small amount, the entire mixture then being stirred until evenly mixed, pressed into the desired shape on an hydraulic press, then fired to a temperature above 2400 degrees Fahrenheit, preferably approximately 2800 degrees Fahrenheit, in an oxidizing atmosphere.

I have also carried out the above procedure where Y in the last mentioned formula was taken as .0756 mole, the calculation showing that X then equals 5.0 pounds of alumina to be added to the starting zirconia. After treating as described above, firing at approximately 2800 degrees Fahrenheit and then cooling and analyzing, the final product showed 17 percent of the zirconia in the monoclinic phase and 83 percent stabilized cubic form zirconia in the final product.

As a result of the addition of silica or alumina to stabilized zirconia, I am able to decrease the degree of stabilization by a closely controlled and reproducible method, and hence to obtain a close control of the coefficient of expansion and thermal shock characteristics of the modified zirconia. A refractory shape made in this manner has unusual resistance to thermal shock and at the same time its ability to withstand mechanical shock is greatly enhanced. One-half inch diameter spheres made by this method withstood application of an oxy-acetylene torch without breaking, and withstood repeated hammering without breaking. Such spheres made from completely stabilized zirconia would break or shatter into many pieces on application of the torch, and would break readily when hit with a hammer.

In the flame spray method of applying a zirconia coating to various materials such as metals, ceramics, plastics, etc., a much improved coating is obtained by controlling the degrees of stabilization by the method described herein.

Zirconia treated for controlled stabilization, as taught herein, provides a denser material than heretofore known zirconia as a controlled product. Also, the zirconia may be sintered at lower temperatures than heretofore known while obtaining a satisfactory density and hardness. For instance, using the raw zirconia mentioned in the first example above and firing it to about 3000 degrees Fahrenheit, resulted in a zirconia product with about 10 percent pores. Keeping other conditions constant but de-stabilizing the zirconia with silica, as set forth above, resulted in a zirconia having approximately 2 percent or 3 percent pores.

What is claimed is:

1. The method of de-stabilizing zirconia for high heat shock resistance comprising adding to a starting zirconia containing CaO and MgO as the starting agent said zirconia having more than 95 percent in the stabilized cubic form with the stabilizing agent in solid solution with the $ZrO_2$, sufficient acid refractory chosen from the group consisting of silica and alumina to neutralize that portion of the CaO and MgO in said starting zirconia so as to leave unneutralized between approximately 8.23 and 9.35 mole percent of CaO plus MgO therein, and firing said zirconia mixture approximately in the temperature range 2400 degrees Fahrenheit to 2900 degrees Fahrenheit in an oxidizing atmosphere, to provide zirconia having approximately 8 percent to 20 percent thereof in monoclinic form.

2. The method of de-stabilizing a starting zirconia for high heat shock resistance comprising determining the percent CaO and MgO and $SiO_2$ in said starting zirconia and then adding to said starting zirconia the number of moles of finely divided $SiO_2$ calculated by adding M, the percent CaO divided by 56, plus N, the percent MgO divided by 40, then subtracting P, the percent $SiO_2$ in the starting zirconia divided by 60, then subtracting Y, a value between approximately 0.065 and 0.0884, where P is less than $M+N-Y$, then mixing the number of moles of added finely divided silica so calculated with said starting zirconia, adding to the mixture a temporary binder, and firing said mixture approximately in the temperature range 2400 degrees Fahrenheit to 2900 degrees Fahrenheit in an oxidizing atmosphere, said binder volatilizing at said firing temperature.

3. The method of de-stabilizing a starting zirconia for high heat shock resistance comprising determining the percent CaO and MgO and $SiO_2$ in said starting zirconia and then adding to said starting zirconia the number of moles of finely divided $Al_2O_3$ calculated by taking approximately five-thirds of the sum calculated by adding M, the percent CaO divided by 56, plus N, the percent MgO divided by 40, then subtracting P, the percent $SiO_2$ in the starting zirconia divided by 60, then subtracting Y, a value between approximately 0.065 and 0.0884, where P is less than $M+N-\tfrac{3}{5}Y$, then mixing the number of moles of finely divided alumina so calculated with said starting zirconia, adding to the mixture a temporary binder, and firing said mixture approximately in the temperature range 2400 degrees Fahrenheit to 2900 degrees Fahrenheit in an oxidizing atmosphere, said binder voltalizing at said firing temperature.

References Cited in the file of this patent

UNITED STATES PATENTS

| | | |
|---|---|---|
| 2,271,369 | Fulcher | Jan. 27, 1942 |
| 2,567,592 | Ballard | Sept. 11, 1951 |

UNITED STATES PATENT OFFICE
CERTIFICATE OF CORRECTION

Patent No. 2,937,102                                May 17, 1960

Harold C. Wagner

It is hereby certified that error appears in the printed specification of the above numbered patent requiring correction and that the said Letters Patent should read as corrected below.

Column 2, line 51, for "3.29 lbs." read -- 3.92 lbs. --.

Signed and sealed this 1st day of November 1960.

(SEAL)
Attest:

KARL H. AXLINE
Attesting Officer

ROBERT C. WATSON
Commissioner of Patents